United States Patent
Sone

(10) Patent No.: US 10,582,067 B2
(45) Date of Patent: Mar. 3, 2020

(54) NON-TRANSITORY COMPUTER-READABLE RECORDING MEDIUM STORING COMPUTER-READABLE INSTRUCTIONS FOR COMMUNICATION DEVICE AND COMMUNICATION DEVICE

(71) Applicant: BROTHER KOGYO KABUSHIKI KAISHA, Nagoya-shi, Aichi (JP)

(72) Inventor: Tatsuhiko Sone, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/295,082

(22) Filed: Mar. 7, 2019

(65) Prior Publication Data

US 2019/0306335 A1    Oct. 3, 2019

(30) Foreign Application Priority Data

Mar. 27, 2018   (JP) .................................. 2018-060026

(51) Int. Cl.
*H04N 1/00* (2006.01)

(52) U.S. Cl.
CPC ..... *H04N 1/00307* (2013.01); *H04N 1/00392* (2013.01); *H04N 1/00973* (2013.01); *H04N 2201/006* (2013.01)

(58) Field of Classification Search
CPC .................................................. H04N 1/00307
USPC ........................................................ 358/1.15
See application file for complete search history.

(56) References Cited

U.S. PATENT DOCUMENTS

2013/0229684 A1    9/2013  Yasuzaki
2017/0272591 A1*   9/2017  Odaira ............... H04N 1/00477

FOREIGN PATENT DOCUMENTS

JP    2017-027619 A    2/2017
JP    2017-167911 A    9/2017

OTHER PUBLICATIONS

Wi-Fi Alliance, "Wi-Fi Peer-to-Peer (P2P) Technical Specification version 1.5", Aug. 4, 2014 (Aug. 4, 2014), pp. 1-183, Retrieved from the Internet <URL:https://www.wi-fi.org/downloads-registered/Wi-Fi_P2P_Technical_Specification_v1.5.pdf> [retrieved on Dec. 9, 2015].

* cited by examiner

*Primary Examiner* — Jacky X Zheng
(74) *Attorney, Agent, or Firm* — Scully, Scott, Murphy & Presser, PC

(57) ABSTRACT

A communication device may display a specific screen including a selection image and a plurality of item images, and in a first case where the selection image is selected, supply a trigger instruction to an OS program. The trigger instruction may include an instruction for causing the OS program to display a first image, and the first image may be for notifying a user to perform a predetermined action which is necessary for executing a wireless communication with an external device. The first image may be displayed such that at least one item image among the plurality of item images is not displayed. The communication device, in the first case after the specific screen has been displayed, may output target information related to the at least one item image.

10 Claims, 12 Drawing Sheets ns for a communication device. The communication device may comprise a display unit; a wireless interface; a computer; and an Operating System (OS) program executed by the computer. The computer-readable instructions, when executed by the computer, may cause the communication device to perform: displaying a specific screen on the display unit, the specific screen including a selection image and a plurality of item images, the selection image being for a user to select execution of a wireless communication via the wireless interface with an external device; in a first case where the selection image included in the specific screen is selected, supplying a trigger instruction for executing the wireless communication with the external device to the OS program, the trigger instruction including an instruction for causing the OS program to display a first image on the display unit, the first image being for notifying the user to perform a predetermined action which is necessary for executing the wireless communication with the external device, and the first image being displayed such that at least one item image among the plurality of item images included in the specific screen is not displayed; and in the first case after the specific screen has been displayed on the display unit, outputting target information related to the at least one item image.

NON-TRANSITORY COMPUTER-READABLE RECORDING MEDIUM STORING COMPUTER-READABLE INSTRUCTIONS FOR COMMUNICATION DEVICE AND COMMUNICATION DEVICE

CROSS-REFERENCE

This application claims priority to Japanese Patent Application No. 2018-060026, filed on Mar. 27, 2018, the entire contents of which are incorporated herein by reference.

TECHNICAL FIELD

The disclosure herein discloses a technology related to a communication device capable of communicating with an external device.

BACKGROUND ART

A mobile communication terminal device capable of communicating with a multifunction peripheral (MFP) is known. The terminal device displays a screen that includes setting items such as a paper type and a paper width, and a message notifying a user that preparation for NFC communication has been done. In the screen, an area where the setting items are displayed is different from an area where the message is displayed.

SUMMARY

The technology above does not assume a configuration in which, when a certain image is to be displayed while another image is displayed, for example, the certain image is to be displayed such that at least a part of the other image is not displayed (e.g., a configuration in which the certain image is to be displayed in front of the other image). In such a configuration, a user cannot recognize at least a part of the other image. The disclosure herein provides a technology capable of improving user's convenience when images different from each other are displayed.

The disclosure herein discloses a non-transitory computer-readable recording medium storing computer-readable instructions for a communication device. The communication device may comprise a display unit; a wireless interface; a computer; and an Operating System (OS) program executed by the computer. The computer-readable instructions, when executed by the computer, may cause the communication device to perform: displaying a specific screen on the display unit, the specific screen including a selection image and a plurality of item images, the selection image being for a user to select execution of a wireless communication via the wireless interface with an external device; in a first case where the selection image included in the specific screen is selected, supplying a trigger instruction for executing the wireless communication with the external device to the OS program, the trigger instruction including an instruction for causing the OS program to display a first image on the display unit, the first image being for notifying the user to perform a predetermined action which is necessary for executing the wireless communication with the external device, and the first image being displayed such that at least one item image among the plurality of item images included in the specific screen is not displayed; and in the first case after the specific screen has been displayed on the display unit, outputting target information related to the at least one item image.

The above communication device itself is also novel and useful. Moreover, a communication system that includes the above communication device and the above external device is also novel and useful.

BRIEF DESCRIPTION OF THE DRAWINGS

EMBODIMENT (Configuration of Communication System 2: FIG. 1)

As shown in FIG. 1, a communication system 2 includes a mobile terminal 10 and a multifunction peripheral (hereinafter termed "MFP") 100. The mobile terminal 10 and the MFP 100 are capable of mutually executing Wi-Fi communication which is wireless communication according to a Wi-Fi scheme and Near Field Communication (NFC) communication which is wireless communication according to an NFC scheme.

(Configuration of Mobile Terminal 10)

Figure 1:
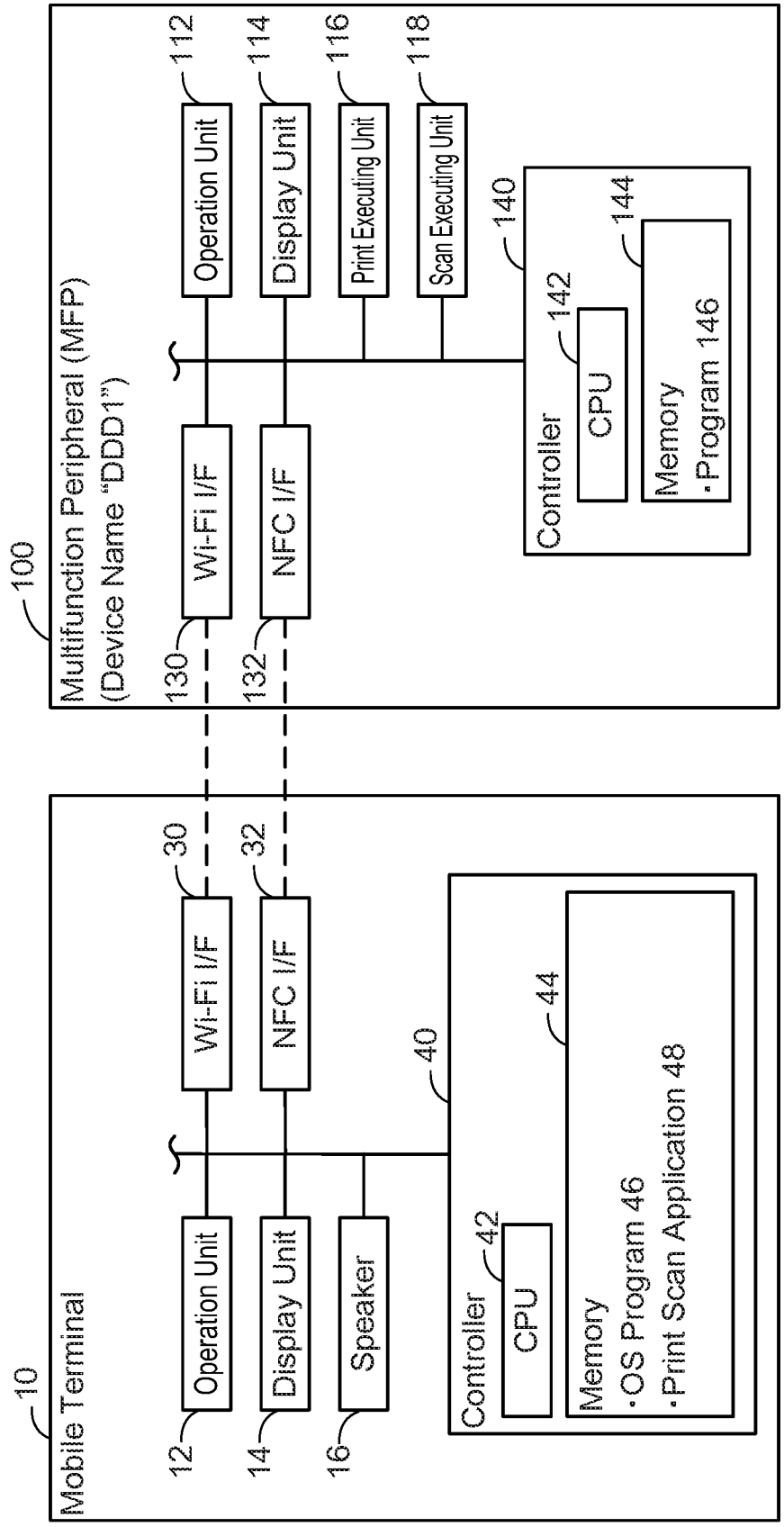
FIG. 1 shows a configuration of a communication system.

The mobile terminal 10 is a portable communication device such as a mobile phone, a smartphone, a PDA, a notebook PC, a tablet PC, a mobile music player, or a mobile video player. The mobile terminal 10 includes an operation unit 12, a display unit 14, a speaker 16, a Wi-Fi interface (interface will hereinafter be described as "I/F") 30, an NFC I/F 32, and a controller 40.

The operation unit 12 includes a plurality of keys. A user can input various instructions into the mobile terminal 10 by operating the operation unit 12. The display unit 14 is a display for displaying various types of information. The display unit 14 also functions as a so-called touch panel (i.e., as an operation unit). The speaker 16 outputs audio data.

The Wi-Fi I/F 30 is an I/F for executing Wi-Fi communication according to the Wi-Fi scheme. The Wi-Fi scheme is a wireless communication scheme based on, for example, 802.11 standard of the Institute of Electrical and Electronics Engineers, Inc. (IEEE) and standards complying thereto (e.g., 802.11a, 11b, 11g, 11n, 11ac, and the like).

The NFC I/F 32 is an I/F for executing NFC communication according to the NFC scheme. The NFC scheme is a wireless communication scheme based on, for example, international standards such as ISO/IEC 14443, 15693, and 18092. As types of I/F for executing NFC communication, an I/F called an NFC forum device and an I/F called an NFC forum tag are known. The NFC I/F 32 is an NFC forum device and is configured to selectively operate in any one of a Peer To Peer (P2P) mode, a Reader/Writer (R/W) mode, and a Card Emulation (CE) mode.

Differences between the Wi-Fi I/F 30 and the NFC I/F 32 will be described. A communication speed of Wi-Fi communication via the Wi-Fi I/F 30 (e.g., a maximum communication speed of 600 Mbps) is faster than a communication speed of NFC communication via the NFC I/F 32 (e.g., a maximum communication speed of 424 Kbps). Moreover, a carrier wave frequency in Wi-Fi communication via the Wi-Fi I/F 30 (e.g., a 2.4 GHz band or a 5.0 GHz band) differs from a carrier wave frequency in NFC communication via the NFC I/F 32 (e.g., a 13.56 MHz band). Moreover, a maximum distance with which Wi-Fi communication can be executed via the Wi-Fi I/F 30 (e.g., a maximum distance of approximately 100 m) is longer than a maximum distance with which NFC communication can be executed via the NFC I/F 32 (e.g., a maximum distance of approximately 10 cm).

The controller 40 includes a CPU 42 and a memory 44. The memory 44 is constituted of a volatile memory, a nonvolatile memory, and the like. The CPU 42 is configured to execute various processes in accordance with programs 46, 48 stored in the memory 44. An Operating System (OS) program 46 is a program for controlling various basic operations of the mobile terminal 10, and the present embodiment assumes that the OS program 46 is an iOS (registered trademark). A print scan application 48 is an application provided by a vendor of the MFP 100, and is installed in the mobile terminal 10, for example, from a server on the Internet. The print scan application 48 is an application for establishing a Wi-Fi connection between the mobile terminal 10 and the MFP 100, communicating target data (e.g., print data, scan data) by using the Wi-Fi connection between the mobile terminal 10 and the MFP 100, and the like.

(Configuration of MFP 100)

The MFP 100 is a peripheral device (e.g., a peripheral device of the mobile terminal 10) capable of executing multiple functions including a print function and a scan function. The MFP 100 is assigned with a device name "DDD1" which is information for identifying the MFP 100. The MFP 100 includes an operation unit 112, a display unit 114, a print executing unit 116, a scan executing unit 118, a Wi-Fi I/F 130, an NFC I/F 132, and a controller 140.

The operation unit 112 includes a plurality of keys. The user can input various instructions into the MFP 100 by operating the operation unit 112. The display unit 114 is a display for displaying various types of information. The display unit 114 also functions as a so-called touch panel (i.e., as an operation unit). The print executing unit 116 is a print mechanism of an inkjet type, a laser type, or the like. The scan executing unit 118 is a scan mechanism such as a CCD or a CIS.

The Wi-Fi I/F 130 and the NFC I/F 132 are respectively similar to the Wi-Fi I/F 30 and the NFC I/F 32 in the mobile terminal 10. It should be noted that the Wi-Fi I/F 130 supports, especially, a Wi-Fi Direct (registered trademark, WFD) scheme established by the Wi-Fi Alliance. The WFD scheme is a wireless communication scheme described in the specification "Wi-Fi Peer-to-Peer (P2P) Technical Specification Version 1.5" formulated by the Wi-Fi Alliance. In a variant, the NFC I/F 132 may be an NFC forum tag.

The controller 140 includes a CPU 142 and a memory 144. The CPU 142 is configured to execute various processes in accordance with a program 146 stored in the memory 144. The memory 144 is constituted of a volatile memory, a nonvolatile memory, and the like.

Figure 2:
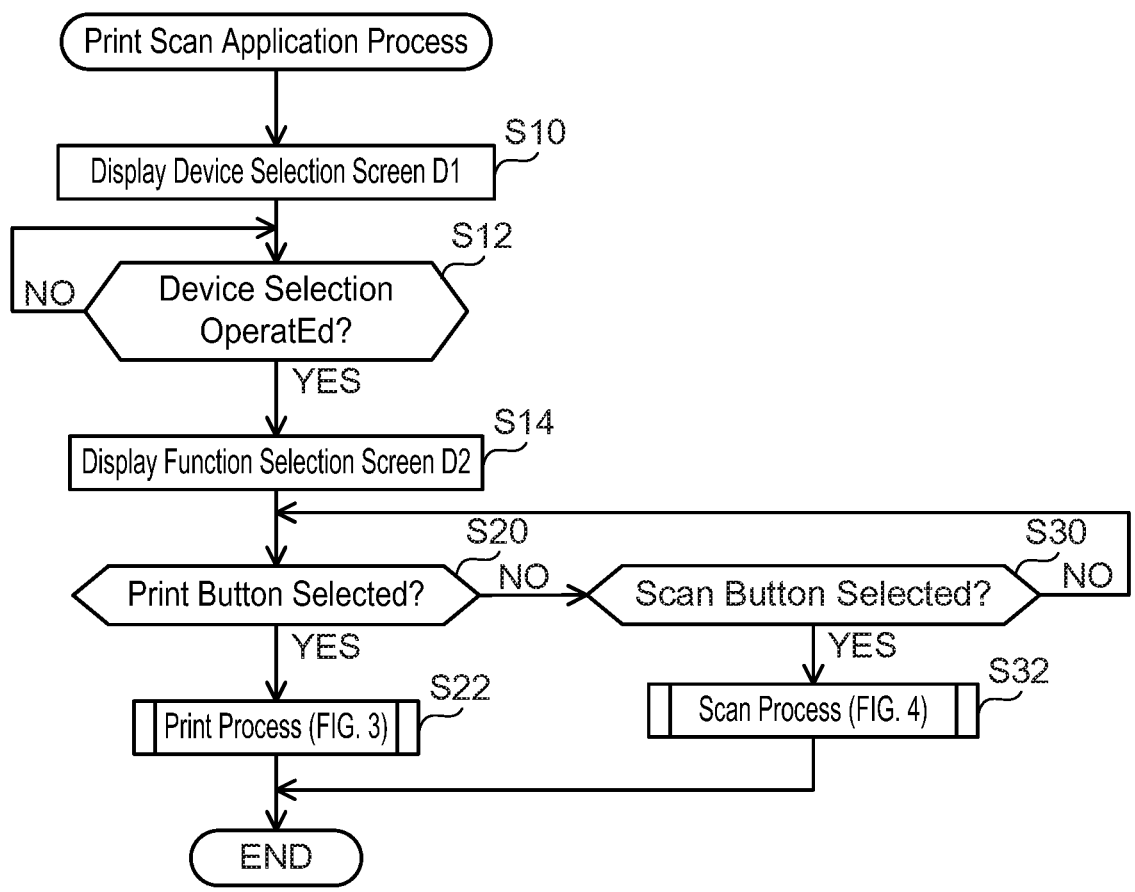
FIG. 2 shows a flowchart of a print scan application process.

(Print Scan Application Process: FIG. 2)

Next, with reference to FIG. 2, a process executed by the CPU 42 of the mobile terminal 10 in accordance with the print scan application 48 will be described. When a user performs an operation to activate the print scan application 48, the process in FIG. 2 is started. At the time when the process in FIG. 2 is started, all of the modes (i.e., the P2P mode, the R/W mode, and the CE mode) of the NFC I/F 32 of the mobile terminal 10 are in a disabled state. The disabled state is a state in which NFC communication cannot be executed, and is a state in which power is not supplied to the NFC I/F 32, for example. For convenience of explanation, processes executed by the CPU 42 in accordance with the print scan application 48 will hereinafter be described with "application 48" as the subject of action, and processes executed by the CPU 42 in accordance with the OS program 46 will hereinafter be described with "OS 46" as the subject of action, instead of describing with the CPU 42 as the subject of action.

Figure 5:
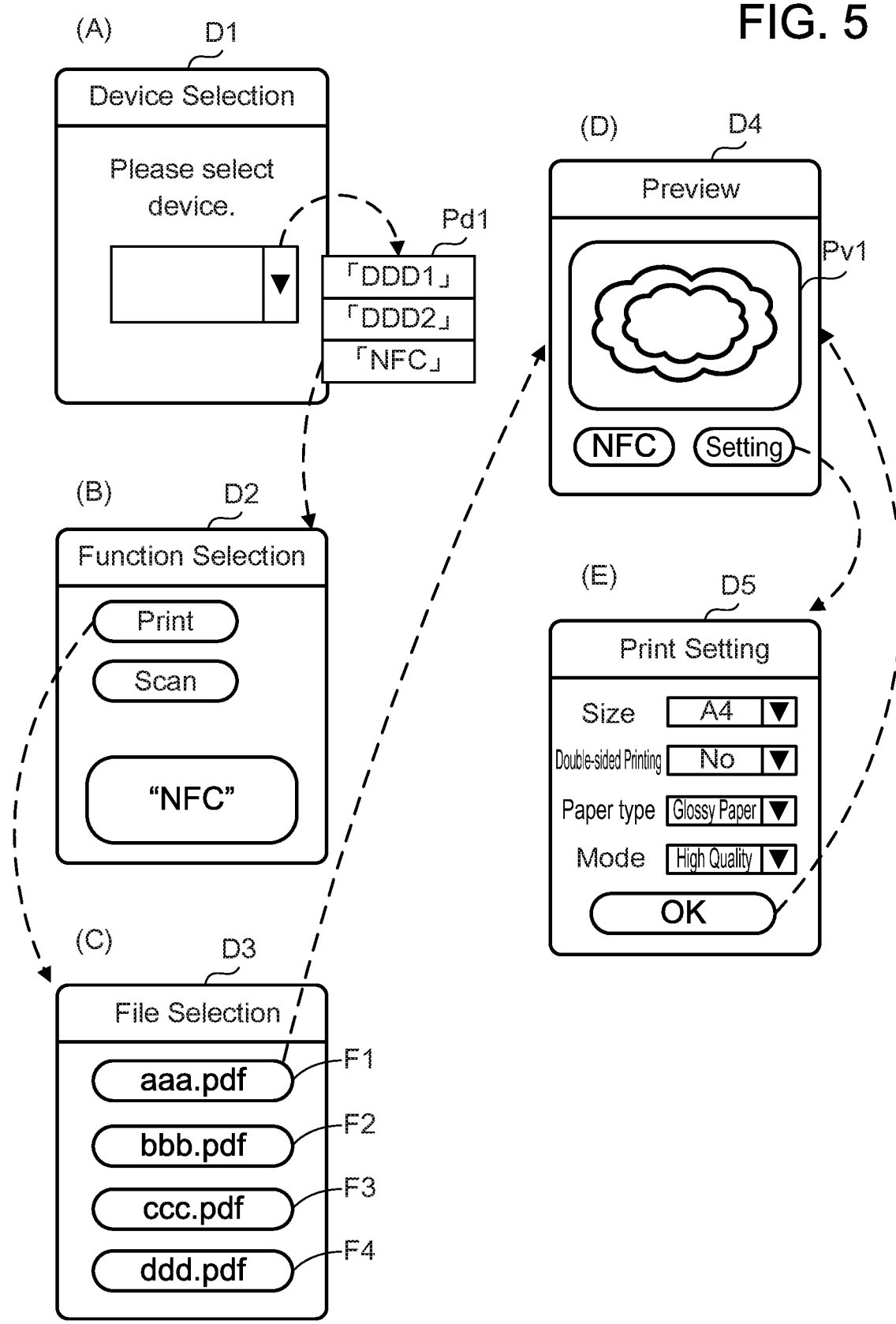
FIG. 5 shows screens related to the print process.

In S10, the application 48 displays a device selection screen D1 on the display unit 14. As shown in FIG. 5(A), the device selection screen D1 includes a message that instructs the user to select a device in which printing or scanning is to be executed, and a device selection field. When the user operates a pull-down button in the device selection field, the application 48 displays a pull-down menu Pd1 on the display unit 14. The pull-down menu Pd1 indicates a device name of a device capable of establishing a Wi-Fi connection with the mobile terminal 10 (such as the device name "DDD1"), and a character string "NFC" meaning NFC communication. The user can operate a device selection of selecting one piece of information from a plurality of information displayed in the pull-down menu Pd1.

In S12, the application 48 monitors whether the device selection is operated. When the device selection is operated (YES in S12), the application 48 proceeds to S14. A case where the character string "NFC" is selected by the device selection will be described hereinafter as an example.

In S14, the application 48 displays a function selection screen D2 on the display unit 14. As shown in FIG. 5(B), the function selection screen D2 includes two buttons respectively corresponding to the print function and the scan function, and the character string "NFC" selected in S12.

Figure 7:
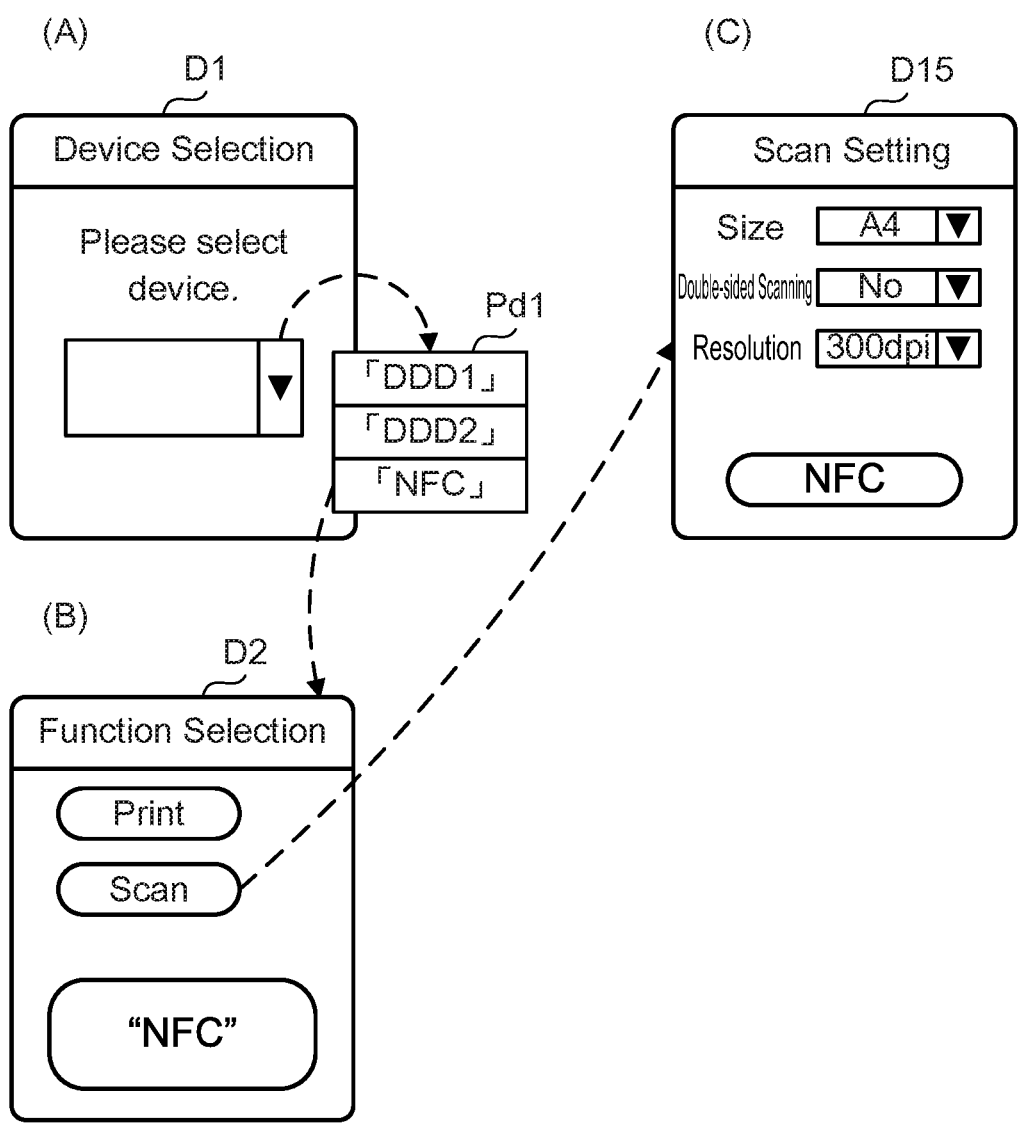
FIG. 7 shows screens related to the scan process.

In S20 and S30, the application 48 monitors whether either one of the print button and the scan button on the function selection screen D2 is selected. When the user selects the print button, the application 48 determines YES in S20, and executes a print process (see FIG. 3) in S22. On the other hand, when the user selects the scan button, the application 48 determines YES in S30, and executes a scan process (see FIG. 4) in S32. When S22 or S32 terminates, the process in FIG. 2 terminates. FIGS. 7(A) and 7(B) show the screens displayed by a time when the scan button has been selected.

Figure 3:
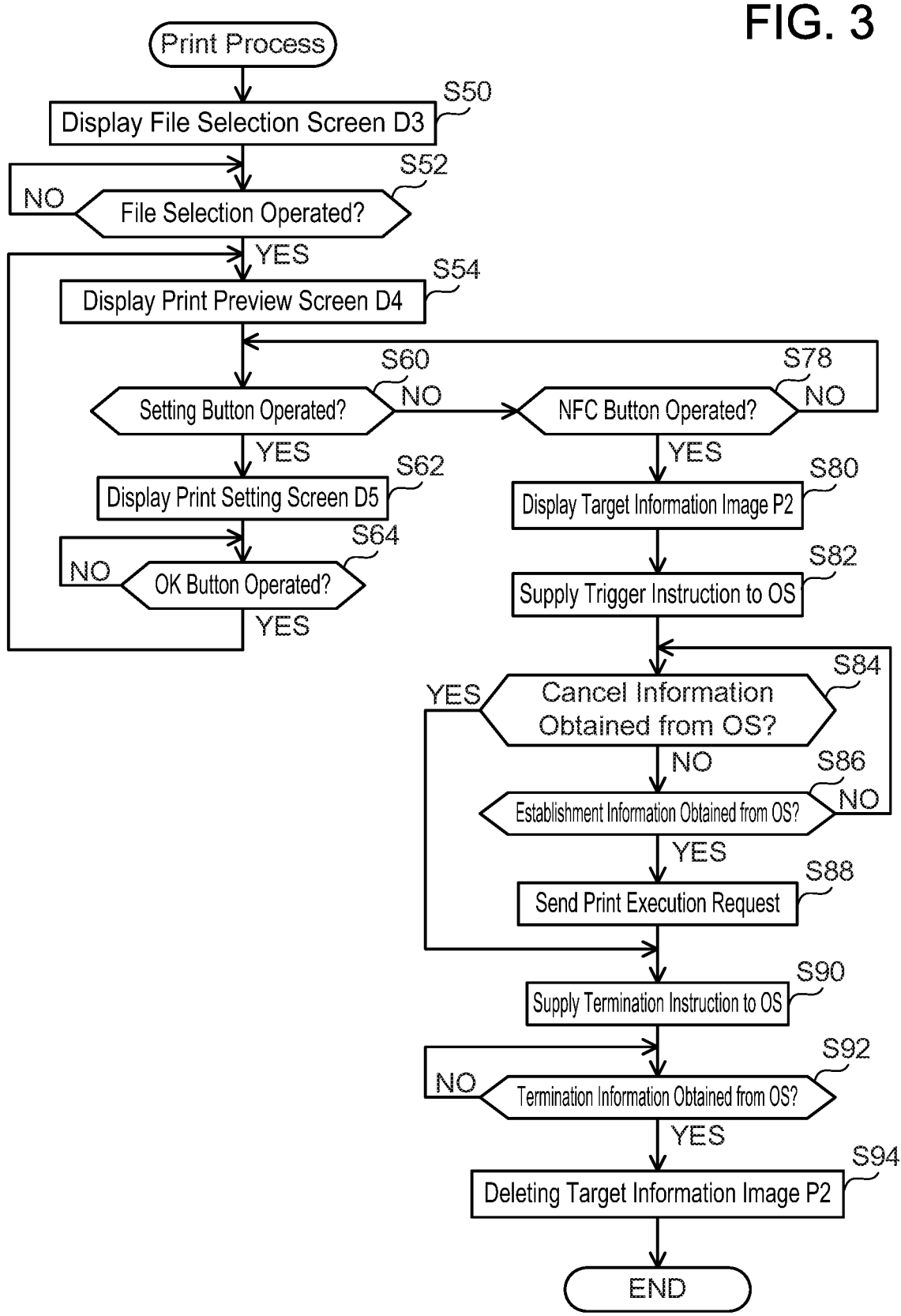
FIG. 3 shows a flowchart of a print process.

(Print Process: FIG. 3)

Next, with reference to FIG. 3, details of the print process executed in S22 of FIG. 2 will be described. In S50, the application 48 displays a file selection screen D3 on the display unit 14. As shown in FIG. 5(C), the file selection screen D3 includes a plurality of file selection buttons F1 to F4 indicating a plurality of file names of a plurality of files stored in the memory 44.

In S52, the application 48 monitors whether a file selection is operated. The file selection is an operation of selecting one of the plurality of file selection buttons F1 to F4 on the file selection screen D3. When the file selection is operated, the application 48 determines YES in S52, and proceeds to SM. A case where the file selection button F1 is selected will be described hereinafter as an example.

In SM, the application 48 displays a print preview screen D4 on the display unit 14. As shown in FIG. 5(D), the print preview screen D4 includes a print preview image Pv1 represented by the file selected in S52, an NFC button, and a setting button.

The print preview image Pv1 is an image corresponding to default print settings preset in the application 48. By viewing the print preview image Pv1, the user can know how the image will be printed. The NFC button is a button for changing the R/W mode of the NFC I/F 32 from the disabled state to an enabled state. The enabled state is a state in which NFC communication in accordance with the R/W mode can be executed, and is a state in which power is supplied to the NFC I/F 32, for example. The setting button is a button for performing print setting.

In S60, the application 48 monitors whether the setting button in the print preview screen D4 is operated. When the setting button is selected, the application 48 determines YES in S60, and proceeds to S62.

In S62, the application 48 displays a print setting screen D5 on the display unit 14. As shown in FIG. 5(E), the print setting screen D5 includes a size setting field for setting a size of printing paper, a double-sided printing setting field for setting whether or not double-sided printing is to be executed, a paper setting field for setting a paper type of the printing paper, a mode setting field for setting a mode for a print image quality, and an OK button. The user can change the print settings on the print setting screen D5.

In S64, the application 48 monitors whether the OK button in the print setting screen D5 is operated. When the OK button is selected, the application 48 determines YES in S64, and displays the print preview screen D4 again on the display unit 14 in S54. Here, the application 48 displays the print preview screen D4 that includes the print preview image Pv1 corresponding to the print settings displayed on the print setting screen D5 when the OK button was selected (i.e., the print settings designated by the user).

Moreover, concurrently with the monitoring of S60, the application 48 monitors, in S78, whether the NFC button in the print preview screen D4 is operated. When the NFC button is selected, the application 48 determines YES in S78, and proceeds to S80.

Figure 6:
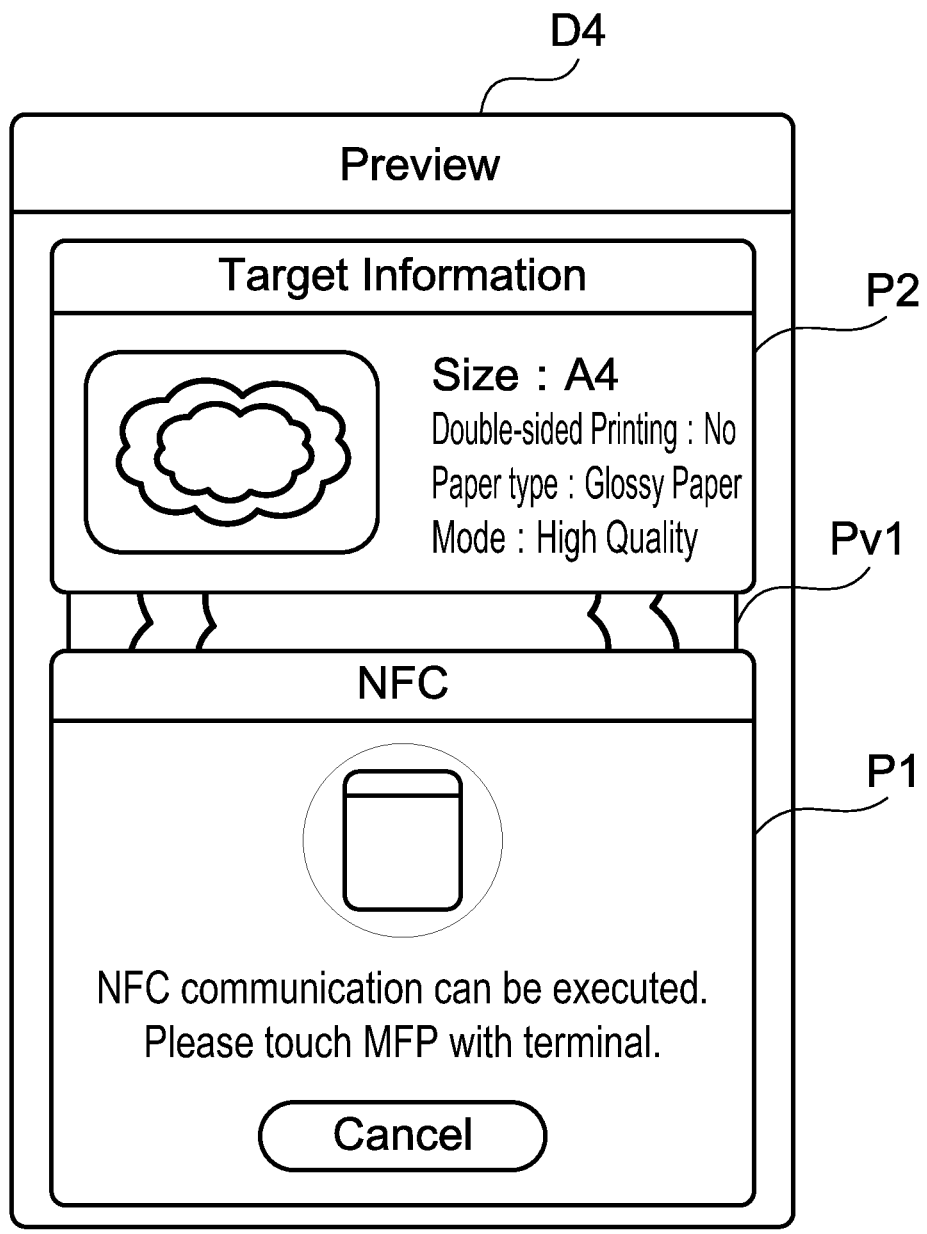
FIG. 6 shows a screen including an image indicating target information.

In S80, the application 48 displays a target information image P2 (see FIG. 6) in front of the print preview screen D4. As shown in FIG. 6, the target information image P2 includes a reduced image that is obtained by reducing the print preview image Pv1 displayed on the print preview screen D4 when the NFC button was selected, and a print setting image that indicates the print settings when the NFC button was selected.

In S82, the application 48 supplies a trigger instruction to the OS 46. The trigger instruction is an instruction for requesting the OS 46 to do the following (1) and (2): (1) to display an NFC image P1 (see FIG. 6) on the display unit 14; and (2) to supply, to the NFC I/F 32, an R/W mode ON instruction for changing the R/W mode from the disabled state to the enabled state.

In response to obtaining the trigger instruction, the OS 46 displays the NFC image P1 on the display unit 14. As shown in FIG. 6, the NFC image P1 includes a message for notifying the user that NFC communication can be executed, a message for notifying the user to bring the mobile terminal 10 close to the MFP, and a cancel button. The NFC image P1 has a rectangular shape with a predetermined width and a predetermined height. Further, the NFC image P1 is displayed at a predetermined reference position in the display unit 14. In particular, the NFC image P1 is displayed in front of the print preview screen D4. Therefore, in the present embodiment, the NFC image P1 is displayed such that the NFC button, the setting button, and a part of the print preview image Pv1 in the print preview screen D4 are not displayed. Thus, the user cannot recognize the NFC button, the setting button, and the part of the print preview image Pv1.

As mentioned above, the application 48 displays the target information image P2 including the reduced image and the print setting image in S80. Thus, the target information image P2 is an image that represents information (i.e., the reduced image) related to the print preview image Pv1 that is not displayed due to the NFC image P1 being displayed by the OS 46, and information (i.e., the print settings) related to the setting button that is not displayed due to the NFC image P1 being displayed by the OS 46. Therefore, by viewing the target information image P2, the user can know the information related to the images that are not displayed due to the NFC image P1 being displayed by the OS 46.

Moreover, when the OS 46 displays the NFC image P1, there is a possibility that the application 48 may not be able to display the target information image P2 due to the CPU 42 being controlled by the OS 46. In view of such a possibility, in the case where the NFC button is operated (YES in S78), the application 48 displays the target information image P2 (S80) before the NFC image P1 is displayed (i.e., before supplying the trigger instruction to the OS 46), in the present embodiment. Due to this, the application 48 can appropriately display the target information image P2 before the NFC image P1 is displayed by the OS 46. In a variant, the application 48 may execute the process of S80 after the execution of the process of S82.

Moreover, the application 48 stores in advance an area where the NFC image P1 is displayed (i.e., the above-mentioned reference position, width, and height). The application 48 displays the target information image P2 such that the target information image P2 does not overlap with the area where the NFC image P1 is displayed. Due to this, the user can appropriately recognize both of the NFC image P1 and the target information image P2. In the present embodiment, the application 48 displays the target information image P2 in front of the print preview screen D4, without closing the print preview screen D4 from the display unit 14. In a variant, however, the application 48 may display the target information image P2 in place of the print preview screen D4 (i.e., by closing the print preview screen D4).

Moreover, when obtaining the trigger instruction from the application 48, the OS 46 supplies, to the NFC I/F 32, the R/W mode ON instruction for changing the R/W mode of the NFC I/F 32 to the enabled state. Consequently, the R/W mode of the NFC I/F 32 is changed from the disabled state to the enabled state.

In S84, the application 48 monitors whether cancel information is obtained from the OS 46. The cancel information is information indicating that the cancel button in the NFC image P1 has been operated. When obtaining the cancel information from the OS 46 (YES in S84), the application 48 skips S86 and S88, and proceeds to S90.

Moreover, concurrently with the monitoring of S84, the application 48 monitors, in S86, whether establishment information is obtained from the OS 46. The establishment information is information indicating that a Wi-Fi connection with an MFP (e.g., the MFP 100) has been established. When a distance between the mobile terminal 10 and the MFP 100 becomes shorter than the maximum distance (e.g., 10 cm) with which NFC communication can be executed after the trigger instruction has been supplied to the OS 46, an NFC connection is established between the mobile terminal 10 and the MFP 100. In this case, the NFC I/F 32 operates in a Reader mode of the R/W mode, and reads out (i.e., receives) wireless setting information from the MFP 100. The OS 46 then obtains the wireless setting information from the NFC I/F 32. The wireless setting information is information for establishing a Wi-Fi connection with the MFP 100 operating as a Group Owner (G/O) of the WFD scheme, and includes a Service Set Identifier (SSID) of a wireless network formed by the MFP 100, a password, and the like. The OS 46 then supplies, to the Wi-Fi I/F 30, a connection instruction including the wireless setting information. The Wi-Fi I/F 30 thereby establishes a Wi-Fi connection with the MFP 100 by using the wireless setting information, and participates, as a child station, in the wireless network in which the MFP 100 operates as a G/O. In this case, the OS 46 obtains, from the Wi-Fi I/F 30, the establishment information indicating that the Wi-Fi connection has been established, and supplies the establishment information to the application 48. When obtaining the establishment information from the OS 46 (YES in S86), the application 48 proceeds to S88.

In S88, the application 48 converts the file selected in S52 to generate print data having a data format that can be interpreted by the MFP 100, and sends a print execution request including the print data and the print settings to the MFP 100 via the Wi-Fi I/F 30 (i.e., by using the Wi-Fi connection). As such, the application 48 sends the print execution request to the MFP 100 by using the Wi-Fi communication, which has the faster communication speed than NFC communication, and thus can send the print execution request to the MFP 100 promptly.

In S90, the application 48 supplies a termination instruction to the OS 46. The termination instruction is an instruction for requesting the OS 46 to do the following (1) and (2): (1) to delete the NFC image P1; and (2) to supply, to the NFC I/F 32, an R/W mode OFF instruction for changing the R/W mode from the enabled state to the disabled state. When obtaining the termination instruction from the application 48, the OS 46 deletes the NFC image P1, and supplies, to the NFC I/F 32, the R/W mode OFF instruction for changing the R/W mode from the enabled state to the disabled state.

In S92, the application 48 monitors whether termination information is obtained from the OS 46. The termination information is information obtained from the OS 46 in response to the supply of the termination instruction to the OS 46, and is information indicating that the OS 46 has deleted the NFC image P1.

When obtaining the termination information from the OS 46 (YES in S92), the application 48 deletes the target information image P2 in S94. Moreover, the application 48 also closes the print preview screen D4.

Figure 4:
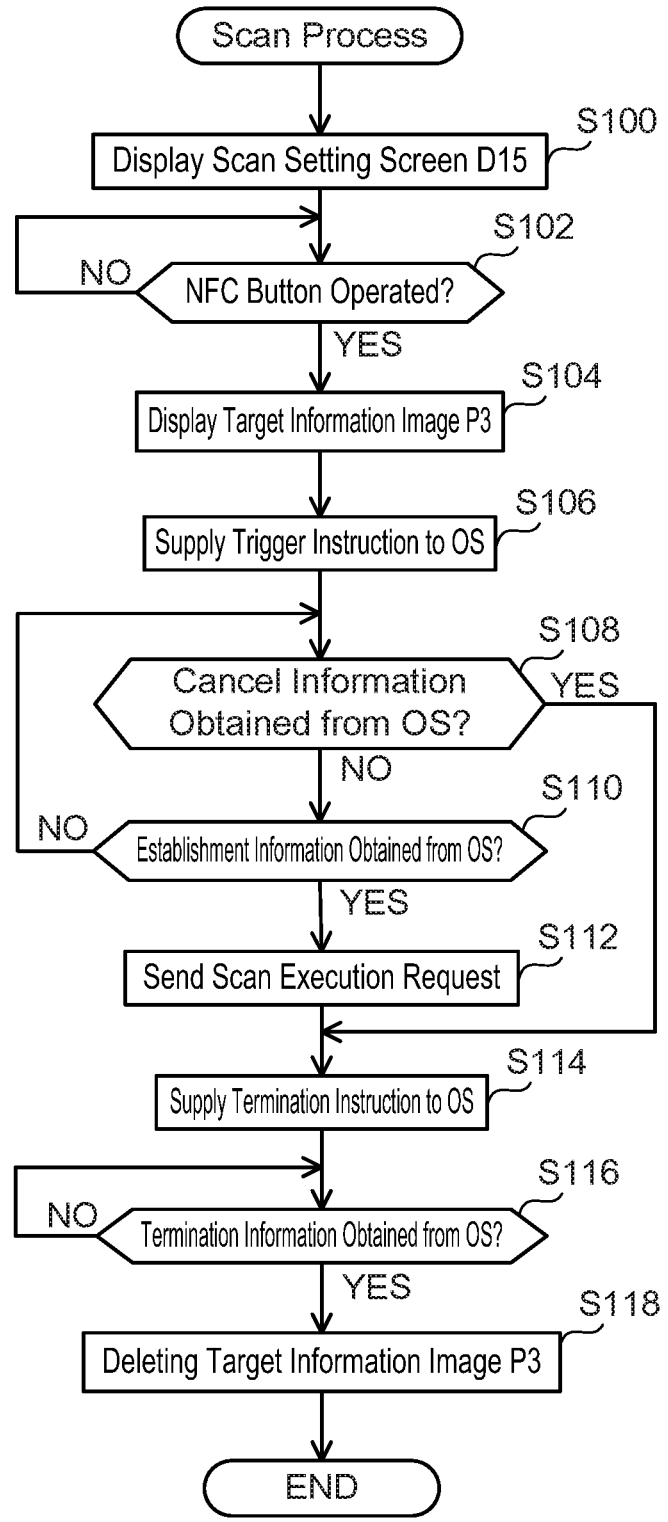
FIG. 4 shows a flowchart of a scan process.

(Scan Process: FIG. 4)

Next, with reference to FIG. 4, details of the scan process executed in S32 of FIG. 2 will be described. In S100, the application 48 displays a scan setting screen D15 on the display unit 14. As shown in FIG. 7(C), the scan setting screen D15 includes a size setting field for selecting a size of a document to be scanned by the MFP 100, a double-sided scanning setting field for setting whether or not double-sided scanning of the document is to be executed, a resolution setting field for setting a scan resolution for the document, and an NFC button. The user can change the scan settings on the scan setting screen D15.

Figure 8:
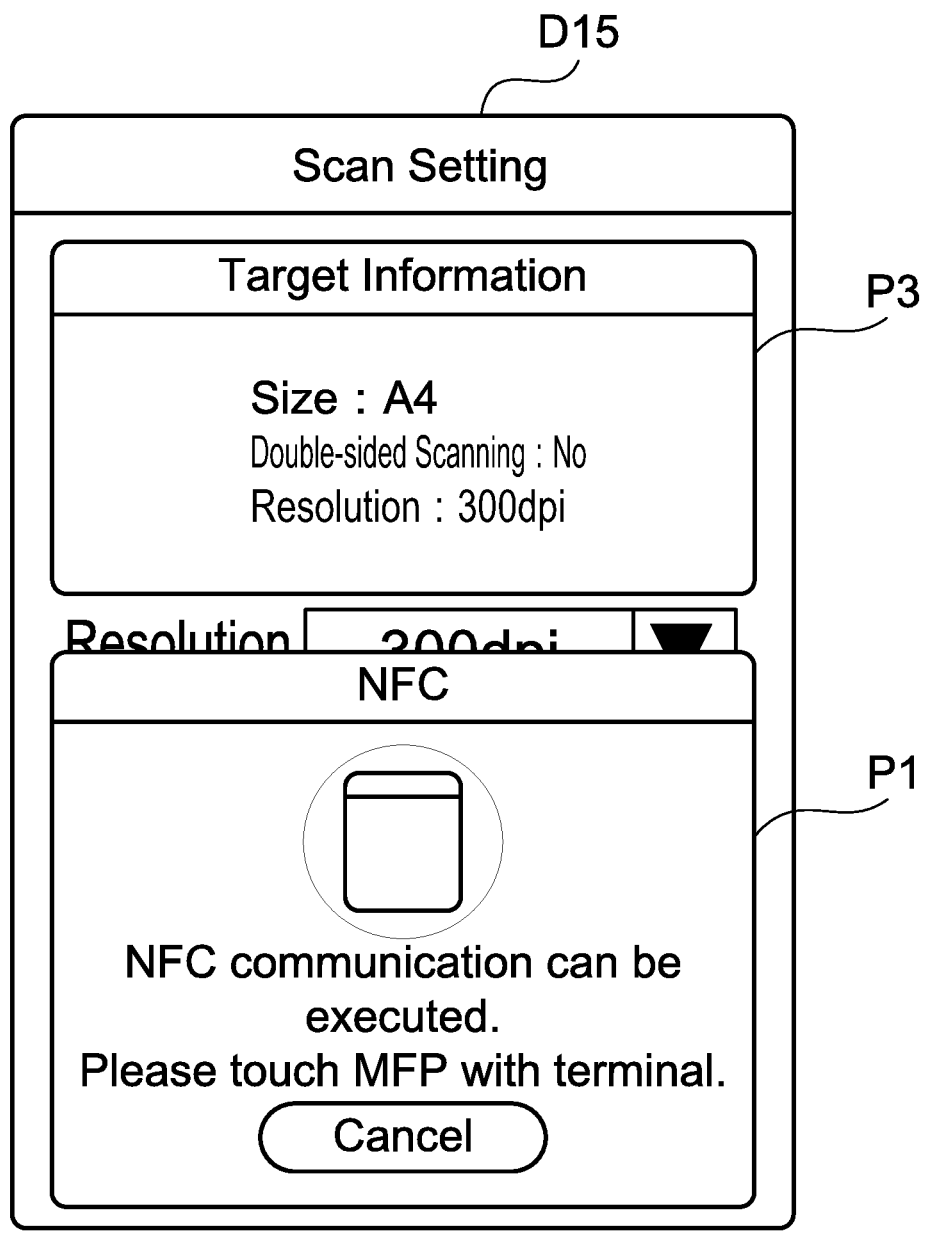
FIG. 8 shows a screen including an image indicating target information.

S102 is similar to S78 in FIG. 3. In S104, the application 48 displays a target information image P3 (see FIG. 8) in front of the scan setting screen D15. As shown in FIG. 8, the target information image P3 includes a scan setting image that indicates the scan settings (i.e., the size setting, the double-sided scanning setting, and the resolution setting) when the NFC button was selected.

S106 is similar to S82 in FIG. 3. In response to obtaining the trigger instruction from the application 48, the OS 46 displays the NFC image P1 on the display unit 14. As shown in FIG. 8, the NFC image P1 is displayed in front of the scan setting screen D15. Therefore, in the present embodiment, the NFC image P1 is displayed such that the NFC button and a part of the resolution setting field in the scan setting screen D15 are not displayed. Thus, the user cannot recognize the NFC button and the part of the resolution setting field.

As mentioned above, the application 48 displays the target information image P3 including the scan setting image in S104. The target information image P3 is thus an image that represents information (i.e., the resolution setting) related to the resolution setting field that is not displayed due to the NFC image P1 being displayed by the OS 46. Therefore, by viewing the target information image P3, the user can know the information related to the image that is not displayed due to the NFC image P1 being displayed by the OS 46. Moreover, as in the print process described above, in the case where the NFC button is operated (YES in S102), the application 48 displays the target information image P3 (S104) before the NFC image P1 is displayed (i.e., before supplying the trigger instruction to the OS 46). Due to this, the application 48 can appropriately display the target information image P3 before the NFC image P1 is displayed by the OS 46. Moreover, the application 48 displays the target information image P3 such that the target information image P3 does not overlap with the area where the NFC image P1 is displayed. Due to this, the user can appropriately recognize both of the NFC image P1 and the target information image P3.

Moreover, when obtaining the trigger instruction from the application 48, the OS 46 supplies, to the NFC I/F 32, the R/W mode ON instruction for changing the R/W mode of the NFC I/F 32 to the enabled state. Consequently, the R/W mode of the NFC I/F 32 is changed from the disabled state to the enabled state.

S108 and S110 are similar to S84 and S86 in FIG. 3. When obtaining the establishment information from the OS 46 (YES in S110), the application 48 sends, to the MFP 100, a scan execution request including the scan settings via the Wi-Fi I/F 30 in S112. Consequently, in the MFP 100, the document is scanned in accordance with the scan settings, and scan data is thereby generated. The application 48 then receives the scan data from the MFP 100 via the Wi-Fi I/F 30. S114 to S118 are similar to S90 to S94 in FIG. 3. When S118 terminates, the process in FIG. 4 terminates.

(Specific Cases)

Next, with reference to FIGS. 9 to 12, specific cases realized by the processes in FIGS. 2 to 4. In an initial state of each case, the MFP 100 is operating as a G/O of the WFD scheme and stores wireless setting information. Moreover, all of the P2P mode, the R/W mode, and the CE mode of the NFC I/F 32 of the mobile terminal 10 are in the disabled state.

Figure 9:
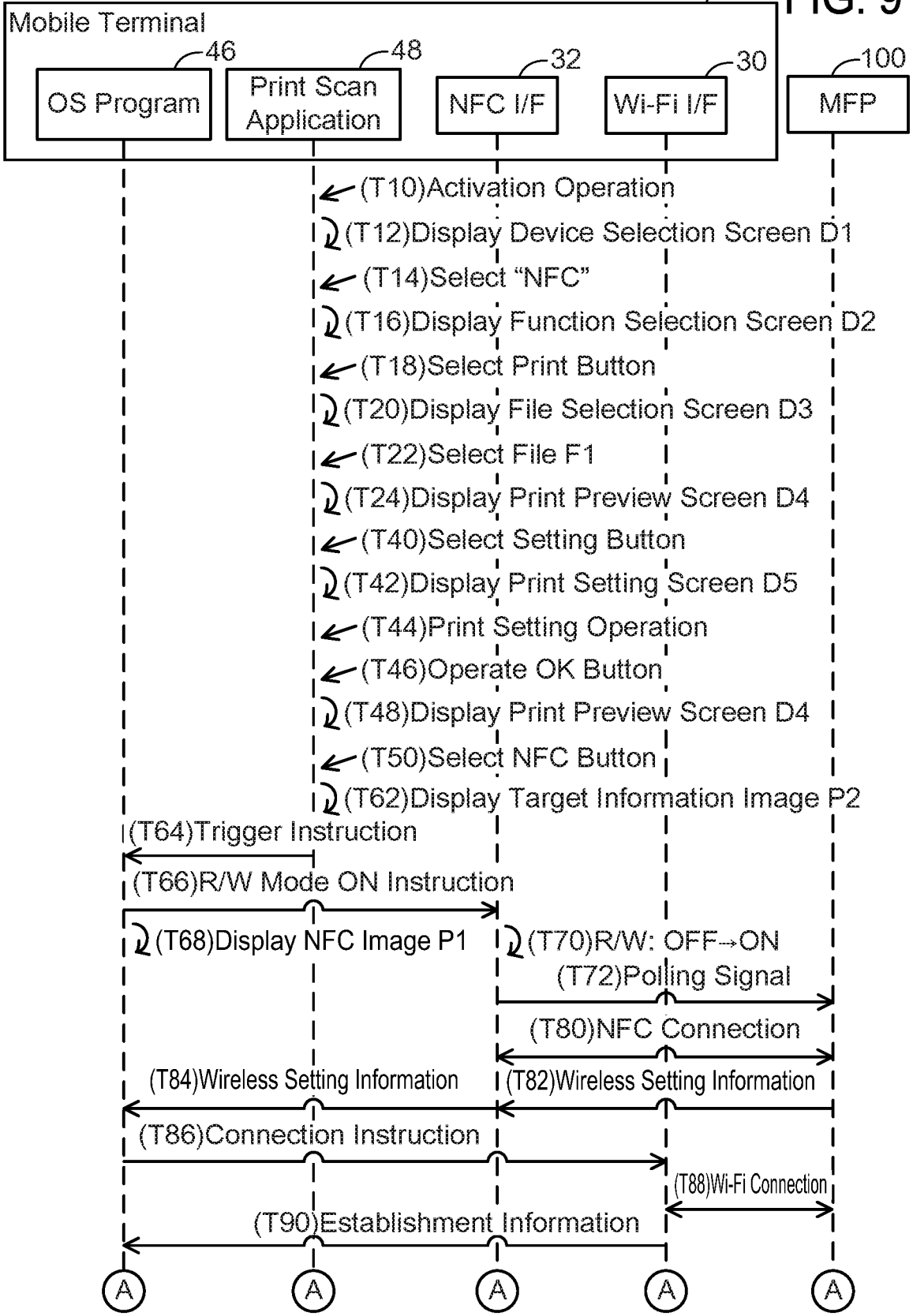
FIG. 9 shows a sequence diagram of a case A1 where printing is executed.
Figure 10:
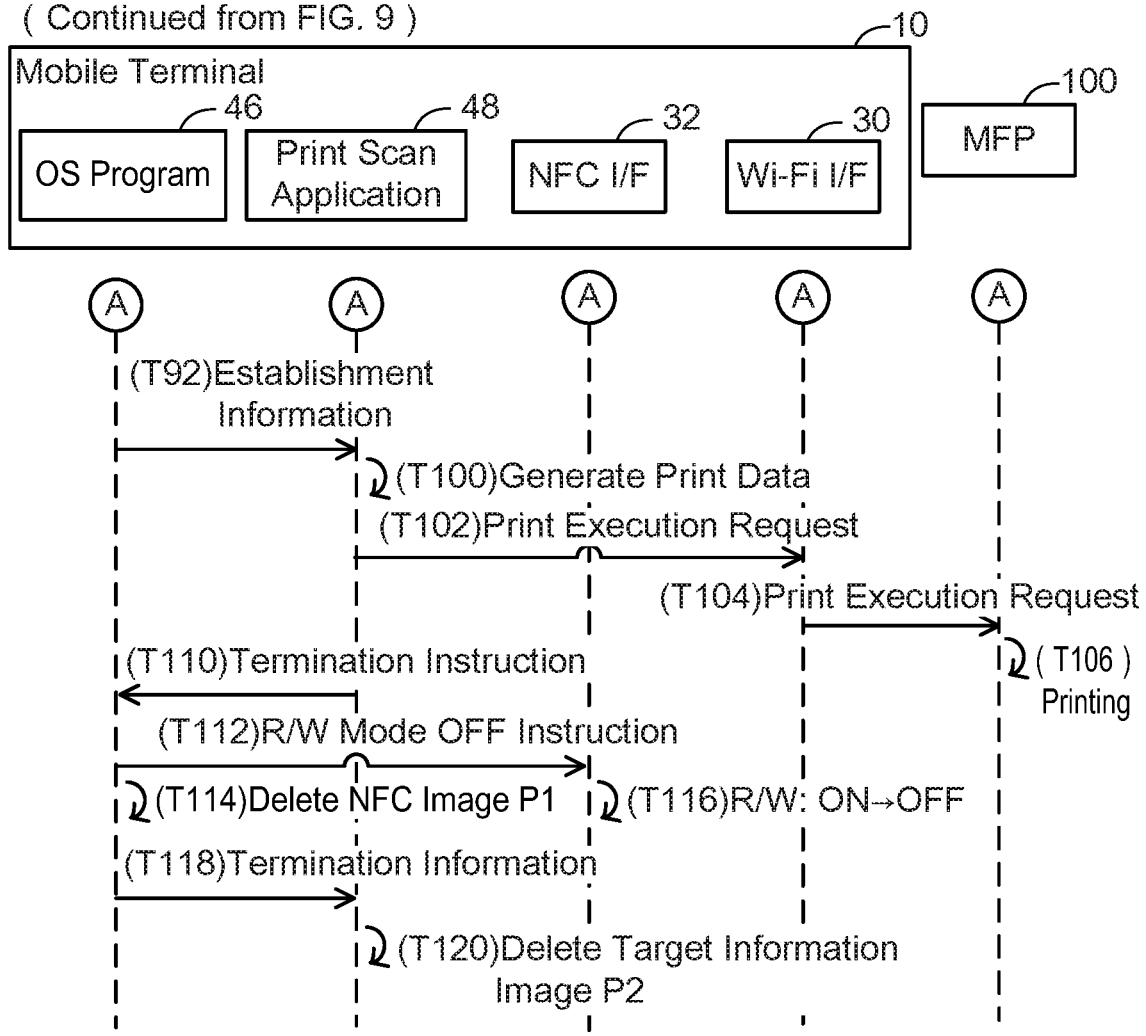
FIG. 10 shows a sequence diagram continued from FIG. 9.

(Case A1: FIGS. 9 and 10)

Firstly, with reference to FIGS. 9 and 10, a case A1 will be described. The present case is a case where the MFP 100 is caused to execute printing. In T10 of FIG. 9, the user performs the operation to activate the application 48. In this case, in T12, the application 48 displays the device selection screen D1 (see FIG. 5(A)) (S10 in FIG. 2).

When accepting the device selection of selecting the character string "NFC" in T14 (YES in S12), the application 48 displays the function selection screen D2 (see FIG. 5(B)) in T16 (S14). Next, when accepting selection of the print button in T18 (YES in S20), the application 48 displays the file selection screen D3 (see FIG. 5(C)) in T20 (S50 in FIG. 3). Next, when accepting selection of the file selection button F1 in T22 (YES in S52), the application 48 displays the print preview screen D4 (see FIG. 5(D)) in T24 (S54).

Subsequently, when accepting selection of the setting button in T40 (YES in S60), the application 48 displays the print setting screen D5 (see FIG. 5(E)) in T42 (S62). When accepting the print setting operation in T44 and accepting operation of the OK button in T46 (YES in S64), the application 48 displays the print preview screen D4 (see FIG. 5(D)) again in T48 (S54).

When accepting selection of the NFC button in T50 (YES in S78), the application 48 displays the target information image P2 (see FIG. 6) on the display unit 14 in T62 (S80). The application 48 then supplies the trigger instruction to the OS 46 in T64 (S82).

When obtaining the trigger instruction from the application 48 in T64, the OS 46 supplies the R/W mode ON instruction to the NFC I/F 32 in T66. Moreover, the OS 46 displays the NFC image P1 (see FIG. 6) in T68.

When obtaining the R/W mode ON instruction from the OS 46 in T66, the NFC I/F 32 changes the R/W mode from the disabled state to the enabled state in T70, and starts transmitting a polling signal in T72. Subsequently, when the user brings the mobile terminal 10 close to the MFP 100, the MFP 100 receives the polling signal, as a result of which an NFC connection is established between the mobile terminal 10 and the MFP 100 in T80. In this case, the NFC I/F 32 receives the wireless setting information from the MFP 100 in T82 by using the NFC connection, and supplies the wireless setting information to the OS 46 in T84.

When obtaining the wireless setting information from the NFC I/F 32 in T84, the OS 46 supplies the connection instruction including the wireless setting information to the Wi-Fi I/F 30 in T86. In this case, the Wi-Fi I/F 30 establishes a Wi-Fi connection with the Wi-Fi I/F 130 of the MFP 100 in T88, and supplies the establishment information to the OS 46 in T90.

When obtaining the establishment information from the OS 46 in T92 of FIG. 10 (YES in S86), the application 48 generates print data in T100, and supplies the print execution request including the print data and the print settings to the Wi-Fi I/F 30 in T102 (S88). Consequently, the Wi-Fi I/F 30 sends the print execution request to the MFP 100 in T104.

When receiving the print execution request from the mobile terminal 10 in T104, the MFP 100 supplies, to the print executing unit 116, the print data and the print settings in the print execution request, and causes the print executing unit 116 to print an image represented by the print data in T106.

The application 48 supplies the termination instruction to the OS 46 in T110 (S90). In this case, the OS 46 supplies the R/W mode OFF instruction to the NFC I/F 32 in T112. Moreover, the OS 46 deletes the NFC image P1 in T114. When obtaining the R/W mode OFF instruction from the OS 46 in T112, the NFC I/F 32 changes the R/W mode from the enabled state to the disabled state in T116, and stops transmitting a polling signal.

When deleting the NFC image P1 in T114, the OS 46 supplies the termination information to the application 48 in T118. In this case, the application 48 deletes the target information image P2 in T120 (S94).

(Effects of Case A1)

In the case where the NFC button in the print preview screen D4 is selected, the OS 46 displays the NFC image P1 in front of the print preview screen D4. Since the OS 46 controls the display of the NFC image P1, the application 48 cannot control a display position and the like of the NFC image P1. In such a circumstance, the NFC button, the setting button, and a part of the print preview image Pv1 in the print preview screen D4 displayed by the application 48 overlap with the NFC image P1 (see FIG. 6), and hence the user cannot recognize these information. In view of this, the application 48 displays the target information image P2 in front of the print preview screen D4 (T62) in the present embodiment. As above, the application 48 newly displays, in front of the print preview screen D4, the information (i.e., the reduced image, the print setting image) related to the images (i.e., the setting button, the print preview image Pv1) that are not displayed due to the NFC image P1 being displayed. Therefore, even when the OS 46 displays the NFC image P1, the user can recognize these information. Due to this, user's convenience can be improved.

Moreover, in response to the execution of the NFC communication (T80), the OS 46 deletes the NFC image P1 (T114) and the application 48 deletes the target information image P2 (T120). As such, when the user brings the mobile terminal 10 close to the MFP 100 (i.e., when the NFC communication between the mobile terminal 10 and the MFP 100 is executed), the images P1, P2 is automatically deleted from the display unit 14. Therefore, the user does not have to perform an operation for deleting the images P1, P2. Due to this, user's convenience can be improved.

Figure 11:
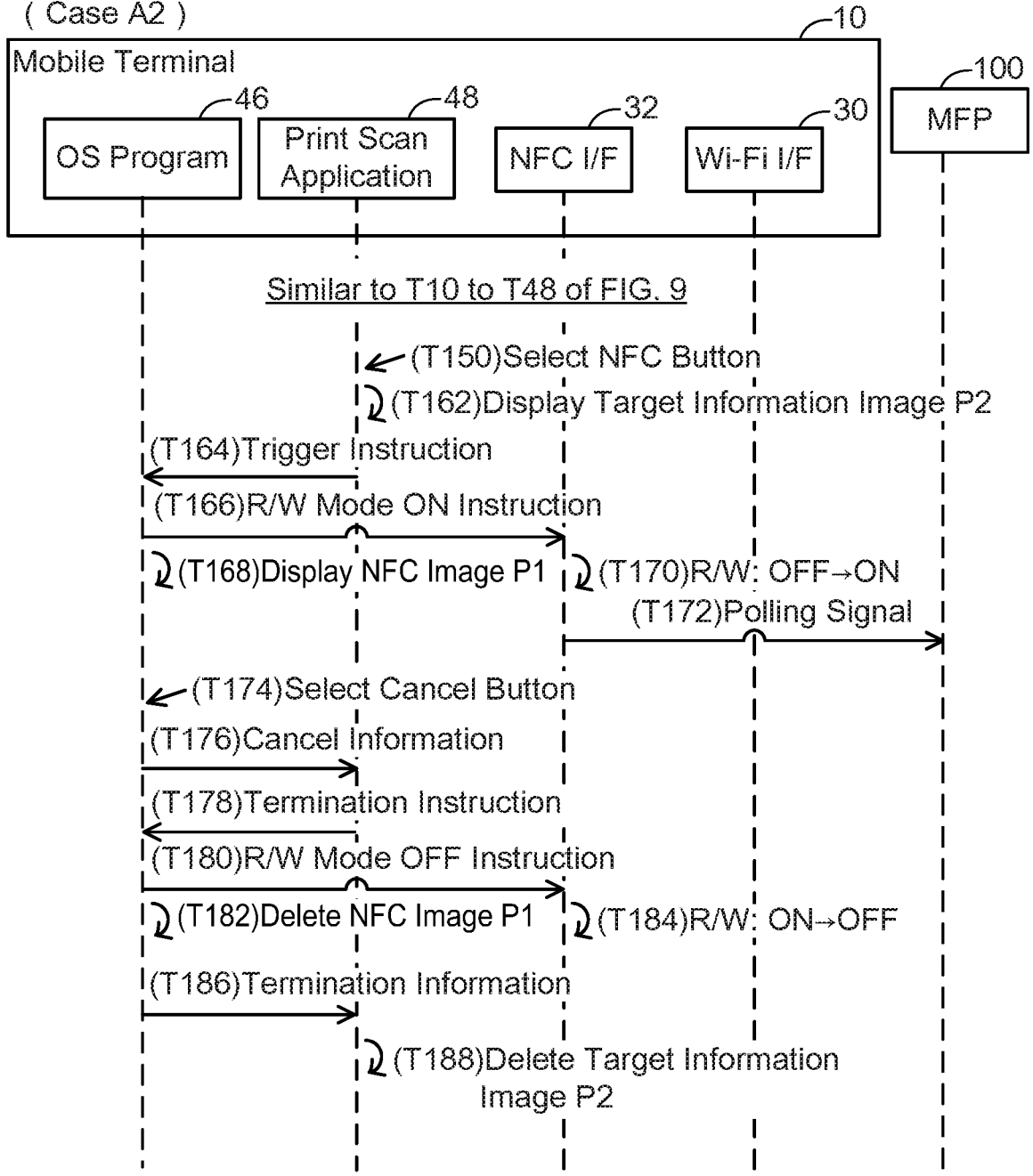
FIG. 11 shows a sequence diagram of a case A2 where printing is not executed.

(Case A2: FIG. 11)

Next, with reference to FIG. 11, a case A2 will be described. The present case is a case where the MFP 100 is not caused to execute printing. In other words, in the present case, execution of NFC communication between the mobile terminal 10 and the MFP 100 is cancelled by the user. Firstly, as shown in FIG. 11, the application 48 executes processes similar to T10 to T48 in FIG. 9.

T150 to T164 are similar to T50 to T64 in FIG. 9. In other words, when displaying the target information image P2 (see FIG. 6) on the display unit 14 in T162 (S80 in FIG. 3), the application 48 supplies the trigger instruction to the OS 46 in T164 (S82). T166 to T172 are similar to T66 to T72 in FIG. 9. In other words, when obtaining the trigger instruction from the application 48 in T164, the OS 46 displays the NFC image P1 (see FIG. 6) in T168.

Subsequently, when accepting selection of the cancel button in T174, the OS 46 supplies the cancel information to the application 48 in T176. When obtaining the cancel information from the OS 46 in T176 (YES in S84), the application 48 supplies the termination instruction to the OS 46 in T178 (S90). T180 to T188 are similar to T112 to T120 in FIG. 10.

(Effects of Case A2)

In the present case, in the case where the NFC button in the print preview screen D4 is selected (T150), the application 48 displays the target information image P2 (T162). While checking the print settings and the like included in the target information image P2, the user can determine whether or not the MFP 100 is to be caused to execute the print process. In response to the selection of the cancel button by the user (T174), the OS 46 deletes the NFC image P1 (T182) and the application 48 deletes the target information image P2 (T188). As such, when the user operates the cancel button for deleting the NFC image P1, the target information image P2 is automatically deleted. The user does not have to perform an operation for deleting the target information image P2, in addition to the operation of the cancel button. Due to this, user's convenience can be improved.

Figure 12:
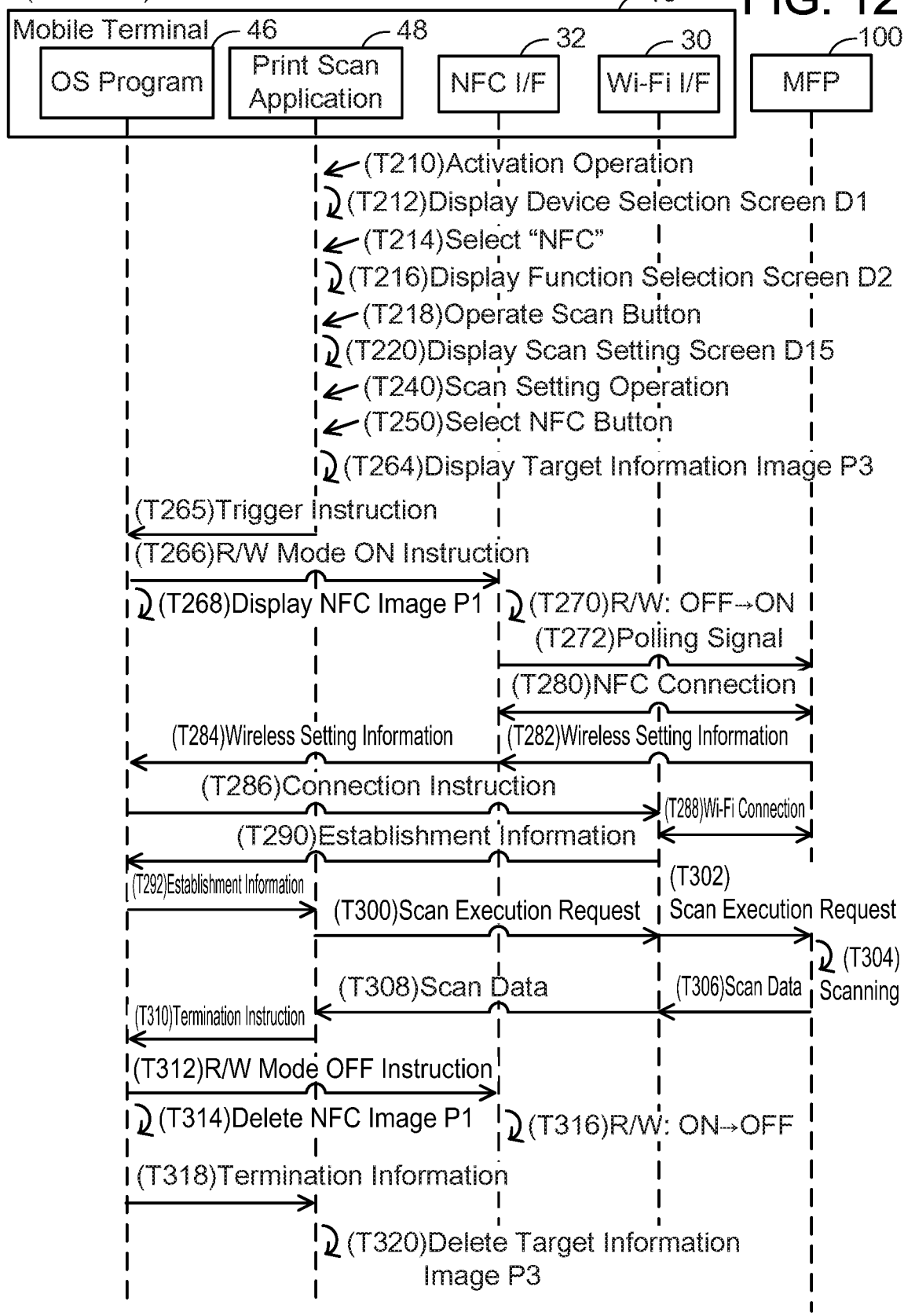
FIG. 12 shows a sequence diagram of a case B where scanning is executed.

(Case B: FIG. 12)

Next, with reference to FIG. 12, a case B will be described. The present case is a case where the MFP 100 is caused to execute scanning T210 to T216 are similar to T10 to T16 in FIG. 9. When accepting the operation of the scan button in T218 (YES in S30 in FIG. 2), the application 48 displays the scan setting screen D15 (see FIG. 7(C)) in T220 (S100 in FIG. 4). Subsequently, the application 48 accepts the scan setting operation in T240. When accepting selection of the NFC button in T250 (YES in S102), the application 48 displays the target information image P3 (see FIG. 8) in T264 (S104), and supplies the trigger instruction to the OS 46 in T265 (S106). T266 to T290 are similar to T66 to T90 in FIG. 9.

When obtaining the establishment information from the OS 46 in T292 (YES in S110), the application 48 supplies, to the Wi-Fi I/F 30, the scan execution request that includes the scan settings in T300. Consequently, the Wi-Fi I/F 30 sends the scan execution request to the MFP 100 in T302 (S112).

When receiving the scan execution request from the mobile terminal 10 in T302, the MFP 100 causes the scan executing unit 118 to scan a document set in the MFP 100 in accordance with the scan settings in the scan execution request in T304, and sends scan data to the mobile terminal 10 in T306.

The application 48 receives the scan data from the MFP 100 via the Wi-Fi I/F 30 in T308. T310 to T318 are similar to T110 to T118 in FIG. 10. When obtaining the termination information from the OS 46 in T318 (YES in S116), the application 48 deletes the target information image P3 in T320 (S118).

(Effects of Case B)

In the case where the NFC button in the scan setting screen D15 is selected, the OS 46 displays the NFC image P1 in front of the scan setting screen D15. As described above, since the OS 46 controls the display of the NFC image P1, the application 48 cannot control a display position and the like of the NFC image P1. In such a circumstance, a part of the resolution setting field in the scan setting screen D15 displayed by the application 48 overlaps with the NFC image P1 (see FIG. 8), and thus the user cannot view the resolution setting. In view of this, the application 48 displays the target information image P3 in front of the scan setting screen D15 (T264) in the present embodiment. As such, the application 48 newly displays, in front of the scan setting screen D15, the information (i.e., the scan setting image) related to the image (i.e., the resolution setting field) that is not displayed due to the NFC image P1 being displayed. Therefore, even when the OS 46 displays the NFC image P1, the user can recognize the information. Due to this, user's convenience can be improved.

(Correspondence Relationships)

The mobile terminal 10 and the MFP 100 are examples of "communication device" and "external device", respectively. The display unit 14 and the NFC I/F 32 are examples of "display unit" and "wireless interface", respectively. The print preview screen D4 in FIG. 5(D) and the scan setting screen D15 in FIG. 7(C) are examples of "specific screen". The NFC button in the print preview screen D4 and the NFC button in the scan setting screen D15 are examples of "selection image". The print preview image Pv1 and the setting button in the print preview screen D4 and the resolution setting field in the scan setting screen D15 are examples of "at least one item image". The processes of T50 in FIG. 9, T150 in FIG. 11, and T250 in FIG. 12 are examples of "first case". Bringing the mobile terminal 10 close to the MFP 100 is an example of "predetermined action". The NFC image P1 in FIGS. 6 and 8 is an example of "first image". The target information image P2 in FIG. 6 and the target information image P3 in FIG. 8 are examples of "second image". The reduced image of the print preview image Pv1 and the print setting image in the target information image P2 in FIG. 6, and the scan setting image in the target information image P3 in FIG. 8 are examples of "target information". The R/W mode is an example of "mode related to the wireless communication". The R/W mode ON instruction is an example of "change instruction". The print process and the scan process are examples of "specific image process". The print setting image and the scan setting image are examples of "setting information". The processes of T80 in FIG. 9 and T280 in FIG. 12 are examples of "second case". The process of T174 in FIG. 11 is an example of "third case".

S54 in FIG. 3 and S100 in FIG. 4 are examples of "displaying a specific screen on the display unit". S82 in FIGS. 3 and S106 in FIG. 4 are examples of "supplying a trigger instruction". S80 in FIGS. 3 and S104 in FIG. 4 are examples of "outputting target information".

(Variant 1)

In the embodiment above, in the case where the NFC button is selected (YES in S78 in FIG. 3, and YES in S102 in FIG. 4), the application 48 displays the target information images P2, P3 on the display unit 14. However, instead of displaying the target information images P2, P3, the application 48 may convert the print settings and the scan settings into audio data, and may output the audio data from the speaker 16 as a message (e.g., "Size of printing paper is A4"). In other words, "outputting target information" may not display the second image on the display unit.

(Variant 2)

Instead of displaying the target information image P2, the application 48 may obtain a screen-shot image, which is an image in a bitmap format obtained by capturing the print preview screen D4, and may display an image obtained by reducing the screen-shot image such that the reduced screen-shot image does not overlap with the NFC image P1. In the present variant, the reduced screen-shot image is an example of "second image".

(Variant 3)

In the embodiment above, when the NFC image P1 is displayed in front of the print preview screen D4 (T68 in FIG. 9, T168 in FIG. 11), approximately a half of the area of the print preview image Pv1 in the print preview screen D4 is not displayed. In view of this, instead of displaying the target information image P2, the application 48 may adopt the following configuration: the application 48 specifies a center position of a partial area positioned upper relative to the NFC image P1, out of an entire area of the display unit 14, and furthermore, specifies a center position of the print preview image Pv1 in the print preview screen D4; and then the application 48 slides the print preview screen D4 upward such that the center position of the partial area and the center position of the printing preview image Pv1 coincide with each other. According to this configuration, even when the NFC image P1 is displayed, approximately entirety of the print preview image Pv1 can be displayed. In the present variant, sliding the print preview screen D4 is an example of "outputting target information".

(Variant 4)

The R/W mode of the NFC I/F 32 may always be in the enabled state. In this case, there is no need to cause the OS 46 to supply, to the NFC I/F 32, the R/W mode ON instruction for changing the R/W mode from the disabled state to the enabled state. In other words, "trigger instruction" may not include an instruction for supplying the change instruction to the wireless interface.

(Variant 5)

The target information image P2 may be displayed to overlap with the area where the NFC image P1 is displayed (i.e., may be displayed in front of the NFC image P1). In other words, the second image may be displayed to overlap with the area where the first image is displayed.

(Variant 6)

In the case where the NFC communication between the mobile terminal 10 and the MFP 100 is executed (T80 in FIG. 9), the application 48 may not delete the target information image P2. In this case, if accepting an operation for deleting the target information image P2 from the user, the application 48 may delete the target information image P2. Moreover, in the case where the user operates the cancel button in the NFC image P1 (T174 in FIG. 11), the application 48 may not delete the target information image P2. In this case, if accepting the operation for delete the target information image P2 from the user, the application 48 may delete the target information image P2. In other words, the second image may not be deleted in the second case or the third case.

(Variant 7)

The target information image P2 may not include the print setting image, and may include only the reduced image of the print preview image Pv1. In other words, "target information" may not include the setting information. Generally speaking, "target information" may be information of any type, as long as it is information related to an item image that is not displayed due to the first image being displayed. Such an "item image" includes, for example, an image indicating information related to the communication device (e.g., an IP address of the communication device, user information of the communication device, and the like), an image indicating information on the external device, and the like.

(Variant 8)

"External device" is not limited to the MFP 100, and may be a scanner, a printer, a FAX machine, a PC, a server, or the like. If "external device" is a FAX machine, information that indicates a preview image of a target image to be faxed, a destination to which the fax is sent and the like may be regarded as an example of "target information".

(Variant 9)

"Wireless interface" is not limited to the NFC I/F 32, and may be an interface for executing Bluetooth (registered trademark, BT) communication, infrared communication, and the like.

(Variant 10)

In the embodiment above, the respective processes executed by the control unit 40 are implemented by software (i.e., by the OS program 46, the print scan application 48). However, at least one of these processes may be implemented by hardware such as a logic circuit.

What is claimed is:

1. A non-transitory computer-readable recording medium storing computer-readable instructions for a communication device, the communication device comprising:
    a display unit;
    a wireless interface;
    a computer; and
    an Operating System (OS) program executed by the computer,
    wherein the computer-readable instructions, when executed by the computer, cause the communication device to perform:
    displaying a specific screen on the display unit, the specific screen including a selection image and a plurality of item images, the selection image being for a user to select an execution of a wireless communication via the wireless interface with an external device;
    in a first case where the selection image included in the specific screen is selected, supplying a trigger instruction for executing the wireless communication with the external device to the OS program,
        the trigger instruction including an instruction for causing the OS program to display a first image on the display unit, the first image being for notifying the user to perform a predetermined action which is necessary for executing the wireless communication with the external device, and
        the first image being displayed such that at least one item image among the plurality of item images included in the specific screen is not displayed; and
    in the first case after the specific screen has been displayed on the display unit, outputting target information related to the at least one item image.

2. The non-transitory computer-readable recording medium as in claim 1, wherein
    the trigger instruction includes an instruction for causing the OS program to supply a change instruction to the wireless interface, the change instruction being for changing a mode related to the wireless communication from a disabled state to an enabled state.

3. The non-transitory computer-readable recording medium as in claim 1, wherein
    the outputting of the target information includes displaying a second image indicating the target information on the display unit.

4. The non-transitory computer-readable recording medium as in claim 3, wherein
    the second image is displayed on the display unit so as not to overlap with an area where the first image is displayed.

5. The non-transitory computer-readable recording medium as in claim 3, wherein
    the external device is capable of executing a specific image process, and
    the target information includes a preview image of an image to be processed by the specific image process.

6. The non-transitory computer-readable recording medium as in claim 3, wherein
    in a second case where the wireless communication is executed with the external device, the OS program deletes the first image from the display unit, and
    the computer-readable instructions, when executed by the computer, cause the communication device to further perform:
    deleting the second image from the display unit in the second case.

7. The non-transitory computer-readable recording medium as in claim 3, wherein
    in a third case where cancellation of the wireless communication is instructed, the OS program deletes the first image from the display unit, and
    the computer-readable instructions, when executed by the computer, cause the communication device to further perform:

deleting the second image from the display unit in the third case.

8. The non-transitory computer-readable recording medium as in claim 1, wherein the external device is capable of executing a specific image process, and the target information includes setting information indicating an image process setting to be used in the specific image process.

9. The non-transitory computer-readable recording medium as in claim 1, wherein the wireless interface is configured to execute a wireless communication according to a Near Field Communication (NFC) scheme.

10. A communication device comprising:

a display unit;

a wireless interface; and a computer configured to perform:

displaying a specific screen on the display unit, the specific screen including a selection image and a plurality of item images, the selection image being for a user to select an execution of a wireless communication via the wireless interface with an external device;

in a first case where the selection image included in the specific screen is selected, supplying a trigger instruction for executing the wireless communication with the external device to an Operating System (OS) program of the communication device, the trigger instruction including an instruction for causing the OS program to display a first image on the display unit, the first image being for notifying the user to perform a predetermined action which is necessary for executing the wireless communication with the external device, and the first image being displayed such that at least one item image among the plurality of item images included in the specific screen is not displayed; and in the first case after the specific screen has been displayed on the display unit, outputting target information related to the at least one item image.

* * * * *